Nov. 9, 1965  W. H. SCAMMAN  3,216,396
PIG FARROWING HOUSE
Filed Aug. 10, 1964  2 Sheets-Sheet 1
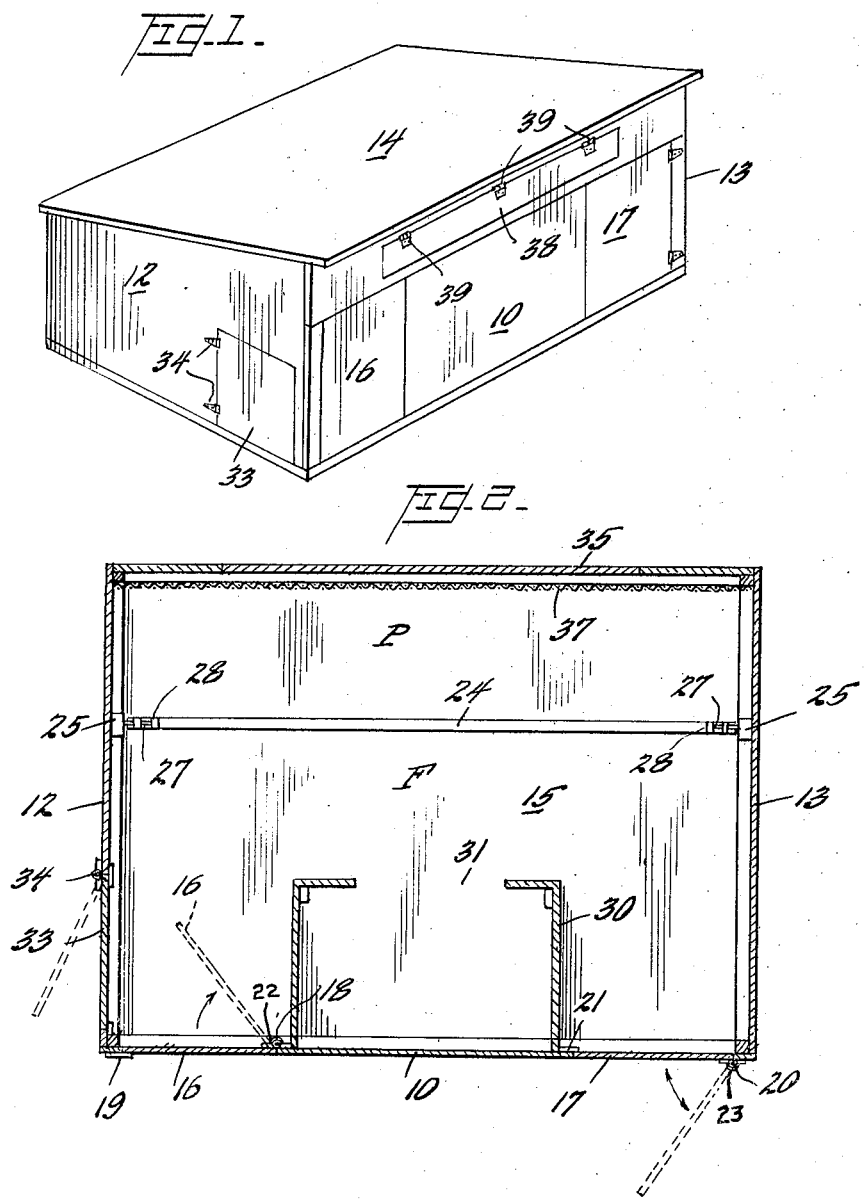
INVENTOR
William H. Scamman,
BY Watson, Cole, Grindle & Watson
ATTORNEYS

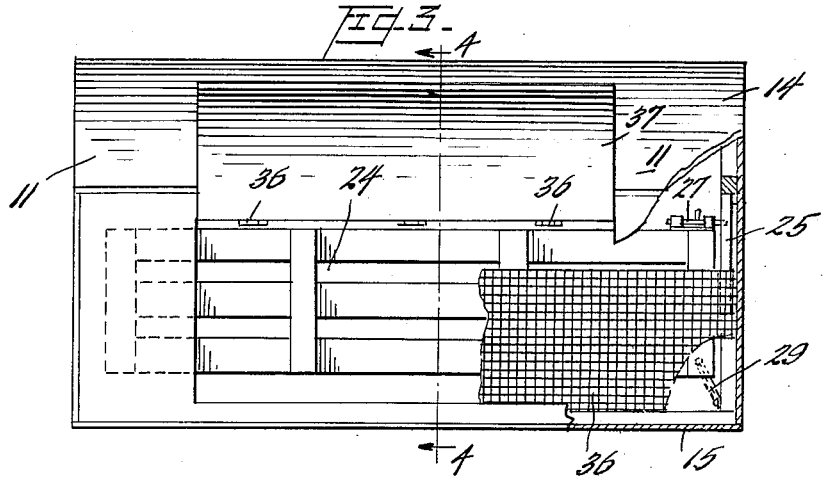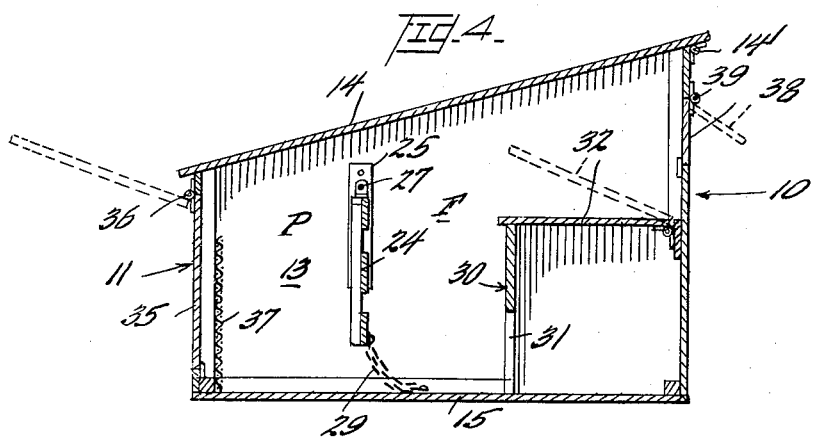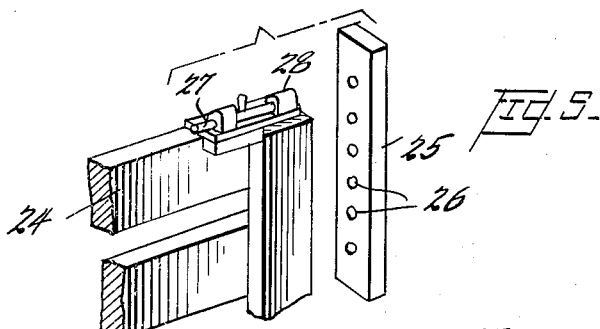

United States Patent Office 3,216,396
Patented Nov. 9, 1965

3,216,396
PIG FARROWING HOUSE
William H. Scamman, P.O. Box 388, Chillicothe, Mo.
Filed Aug. 10, 1964, Ser. No. 388,393
6 Claims. (Cl. 119—20)

This invention relates to improvements in a pig farrowing house.

It is an important object of the invention to provide such a farrowing house in which the sow is caused to enter and to recline in a predetermined position, facing in a predetermined direction, together with means for permitting ready access to the sow whereby assistance and medical attention may be given to the sow and newly born pigs during the farrowing.

It is a further object to provide such a farrowing house in which the sow, as well as the pigs, are free to enter and leave as desired, but in which the passage of any animal through the house is uni-directional to reduce danger of trampling of the young pigs by the sow. In addition, it is an object to provide such a farrowing house in which adequate provision is made to maintain the same in a weatherproof condition with automatically closing entry and exit doors, and which at the same time is provided with arrangements for producing adequate ventilation in warm weather.

A still further object consists in the provision of a sow-confining or restricting barrier adapted to cooperate with the brooder box to cause the sow to recline in a position such that her udders will be readily available to the pigs within the brooder box, and to so position the restricting barrier above the floor of the house as to permit passage beneath it of the pigs into a space from which the sow is excluded, such space and the brooder box itself providing protecting areas in which the pigs are protected from crushing or trampling by the sow.

Among the important advantages obtainable by the invention are: ready access to the sow for assistance during the farrowing operation without the necessity for entry of persons into the housing; also the promotion of sanitary conditions and ease of cleaning arising from a predetermined positioning of the sow with respect to the access opening. In operation, the farrowing house of the invention is particularly adapted for construction as a portable unit having provision for various ventilating openings and adjustments to adapt it for warm weather conditions, as well as for maintenance in a substantially closed weathertight condition for cold weather.

The foregoing, as well as other features and advantages, are attainable by the preferred embodiment of the invention illustrated in the accompanying drawings in which:

FIGURE 1 represents a perspective view of a pig farrowing house in accordance with the invention;

FIGURE 2 is a plan section through the structure shown in FIGURE 1, showing the floor plan thereof;

FIGURE 3 is a rear elevation of the farrowing house with the rear ventilating door opened and with portions of the rear wall and rear screen broken away in order to view other parts;

FIGURE 4 is a vertical section on line 4—4 of FIGURE 3; and

FIGURE 5 is an enlarged fragmentary perspective view of a portion of an upper corner of the restricting barrier or gate showing the manner in which it is removably and adjustably supported within the housing.

In the foregoing drawings, as well as in the detailed description hereinafter following, I have disclosed the preferred mode contemplated by me of practicing the invention, and various parts of the invention and their relationship are described in specific detail. It is to be understood that such parts and their relationships are subject to obvious variations within the scope of the invention.

Referring now to a specific embodiment of the invention, and first considering FIGURE 1, the farrowing house in accordance with the invention generally comprises a quadrangular, preferably shed-type structure which includes vertical front and rear parallel walls 10 and 11, respectively, and parallel end walls 12 and 13. The structure is also provided with a usual sloping roof 14 and a horizontal floor 15. The walls, floor and roof, may all advantageously be formed by plywood of appropriate thickness, but, obviously, other materials of conventional nature may be employed. It is resirable that the material forming the floor 15 have reasonably satisfactory insulating qualities to retain the pigs therein out of contact with the cold earth and to protect them from moisture.

Formed in the front wall 10 are the entry and exit openings which, in the drawings, are shown as occupied by the relatively spaced entry and exit doors 16 and 17, respectively. It is important to the invention that the said doors 16 and 17 are, respectively, of the one-way opening type and are arranged to open inwardly and outwardly, respectively.

Thus referring particularly to FIGURE 2 of the drawings, it will be noted that the entry door 16 is hinged at 18 for inward swinging on a vertical axis at one edge of its associated opening. It is prevented from movement outwardly beyond its normally closed position, as shown in full lines, by stop member 19. The exit door 17 similarly, is hinged to one side of its associated opening at 20 for outward swinging movement only about a vertical axis, and is prevented from inward swinging movement by abutting engagement in its closed position with the stop 21. Springs such as 22 and 23, associated with the conventional spring hinges 18 and 20, exemplify appropriately yieldable means for normally urging the doors toward and retaining them in their closed positions.

It will be readily apparent, therefore, that the door arrangement requires that the passage of animals through the house to be uni-directional.

As will be further apparent from FIGURE 2 in conjunction with FIGURE 4 of the drawings, the interior of the farrowing house will normally be divided by a rigid sow barrier or gate 24 into a farrowing area or compartment, designated F, and a pig compartment P to which the young pigs will have access, while the sow is extruded.

To this end the sow barrier 24 in the preferred embodiment may comprise any usual rigid panel or gate-like structure extending parallel to the front and rear walls 10 and 11 so as to be disposed longitudinally between and supported by the end walls 12 and 13. The brackets 25 on the respective end walls 12 and 13, in association with the sliding bolts 27, provide means for removably positioning the barrier in any of various pre-selected positions with its lower edge spaced above the floor 15 sufficiently to permit the passage beneath the barrier of the pigs while extruding the relatively larger sow.

Considering FIGURES 4 and 5 in somewhat more detail, it will be seen that the brackets 25 which are affixed to the opposite end walls 12 and 13 of the housing are provided with vertical rows of relatively spaced openings 26 adapted for selective reception of the projectable and retractable bolt 27 at each end of the gate 24. The bolts 27 in turn are slidably mounted in conventional brackets 28 secured to the gate or barrier 24. When these bolts 27 are projected into corresponding holes 26 of their supporting brackets 25 they function as pintles to swingably support the barrier at the desired height. The lower edge portion of the barrier 24 is restrained from substantial rearward swinging movement by stop means such as the flexible chains or tethers 29 extending between and connected to the lower edge portion of the barrier and the floor 15.

For housing the newly born pigs in a manner to provide adequate warmth and also to protect them against crushing by the sow, there is provided within the house the brooder box 30, which is located on the floor 15 contiguous to the front wall 10 at a location between the entry and exit doors 16 and 17. This brooder box is provided with a rearwardly oriented opening 31 through which the pigs may have access to the sow for nursing and through which they may come and go as desired.

It will be noted, particularly by reference to FIGURES 2 and 4, that the sow barrier or gate 24 is spaced rearwardly from the brooder box 30. The extent of this spacing is such as to provide a restricted passage through which the sow can pass with ease and within which she is free to recline. At the same time, the width of this passage or space between the brooder box 30 and barrier 24 is insufficient to permit turning around or reversing of its direction by the sow. Thus, as long as the sow is within the farrowing house, she will be positioned within the farrowing compartment or area F thereof, and will at all times while therein be oriented in a predetermined direction with her head facing toward the right as seen in FIGURE 2 of the drawings or, in other words, abreast of the exit door 17.

In view of the well known tendency of a hog to recline with its back against a substantially solid supporting surface, it will be readily apparent that when the sow reclines within the area F, she will automatically assume a position in which her back is toward and generally against the barrier 24 (rather than against the brooder which, because of its opening 31, presents no such surface) while her front and rear legs, respectively, may project into the spaces or bays just inwardly of the doors 17 and 16, respectively.

Thus it will be readily apparent that an access door 33 which opens through the wall 12 into the adjoining end of the farrowing compartment, will permit ready access to the sow, whereby a person located outside of the house may provide ready assistance and medical attention if necessary during the farrowing operation and may, if desired, remove and dry the pigs before placing them in the brooder 30. By virtue of the predetermined location, and orientation of the sow, it will be apparent that any droppings or filth will normally tend to concentrate adjacent the access door 33, and thus may be readily removed in order to maintain appropriatae conditions of sanitation.

If desired, the brooder box 30 may have a hinged rear cover 32 adapted to be propped in a raised or partially raised position as indicated in broken lines in FIGURE 4. This will facilitate the use of a heat lamp of conventional nature or other conventional heating equipment during cold weather and, in addition, may promote proper ventilation in warm weather. Preferably, the box 30 is removable so that after the pigs have attained sufficient size, more space is permitted them within the farrowing house.

It will be seen that the door 33 in the present embodiment is mounted within its associated door opening by hinges such as 34 along one vertical edge.

In order to provide for adequate warm weather ventilation, the roof 14 may be hinged as at 14′, as shown in FIGURE 4 so that it may be swung upwardly generally about its front edge and propped in a raised position. The rear wall 11 of the housing preferably is provided with a door 35 hinged for opening about a horizontal axis as at 36. This door may be propped in an upwardly swung position such as indicated in broken lines in FIGURE 4 to permit ventilation through the rear wall 11 and also to provide a shaded area beneath the open door 35. A screen 37 extending across the door opening is of sufficient height to prevent passage of the pigs through the opening, but at the same time, permits entry of light and air. It may be desirable, also, to provide a hinged vent such as 38 in the front wall 10 above the doors 16 and 17. In this instance the end vent 38 is shown as hinged at 39 for opening about a horizontal axis.

In the use of the invention, the farrowing house will normally be so arranged that its doors 16 and 17 both communicate with an enclosed pen which may contain automatic heating and watering facilities for the sow. Thus, the house and pen will provide a self-contained and self-sufficient unit in which the sow will require little attention except possibly during farrowing. As has been earlier mentioned, the sow will be in a predetermined position and oriented in a predetermined direction both during farrowing and nursing to permit ready access for assistance during farrowing and to localize droppings or dirt to facilitate the removal through the door 33.

The pigs will be kept warm and protected from crushing within the brooder box 30, and the sow will be so positioned as to permit suckling by the pigs through the opening 31 of the brooder box. The barrier 24 in addition to causing the sow to assume the desired position, sub-divides the interior of the housing to provide a heated compartment through which comparatively smaller pigs are permitted to enter and be protected from crushing while the sow is confined in the farrowing compartment F.

Having thus described the invention, what is claimed as new and desired to be secured by Letters Patent is:

1. A pig farrowing house of rectangular shape and plan comprising vertical front and rear longitudinal walls and relatively spaced end walls, said front wall being provided with relatively longitudinally spaced openings, entry and exit doors hingedly mounted for inward and outward opening movement only, respectively, in the said openings, resilient means normally urging said doors toward closed position, a rearwardly opening brooder box adjoining the front wall of said housing and located wholly between its said entry and exit doors and said brooder box, a rigid sow barrier cooperating with said brooder box to define a narrow passage in the house between said doors of a width to permit unrestricted passage of the sow therethrough while preventing it from turning around, an access opening through the end wall of said house adjacent the entry door, and a closure moveably associated with said access opening.

2. A pig farrowing house of rectangular shape and plan comprising vertical front and rear longitudinal walls and relatively spaced end walls, said front wall being provided with relatively longitudinally spaced openings, entry and exit doors hingedly mounted for inward and outward opening movement, respectively, in the respective openings, resilient means normally urging said doors toward closed position, means preventing outward opening of said entry door and means preventing inward opening of said exit door, a generally vertical rigid sow barrier in the said housing dividing same into a farrowing compartment adjoining said front wall and a pig compartment adjoining said rear wall, a rearwardly opening brooder box adjoining the front wall of said housing and located wholly between its said entry and exit doors, a sow barrier defining a narrow passage in the house between said doors of a width to permit unrestricted passage of the sow therethrough while preventing it from turning around, said barrier and brooder box jointly encouraging the sow to recline in a predetermined direction with its back against said barrier and its head directed toward the end of the house adjacent said exit door, an access opening through the end wall of said house adjacent the entry door and a closure moveably associated with said access opening.

3. A pig farrowing house of rectangular shape and plan comprising vertical front and rear longitudinal walls and relatively spaced end walls, said front wall being provided with relatively longitudinally spaced openings, entry and exit doors hingedly mounted for inward and outward opening movement, respectively, in the respective openings, resilient means normally urging said doors toward closed position, means preventing outward opening of said entry door and means preventing inward opening of said exit door, means defining a generally vertical rigid sow barrier in the said housing between and generally parallel to said front and rear walls, means supporting said barrier above the floor of said housing, a brooder box adjoining the front wall of said housing and located wholly between its said entry and exit doors, said brooder box being provided with a rearwardly directed opening, a sow barrier defining a narrow passage in the house between said doors and said brooder box and of a width to permit unrestricted passage of the sow therethrough while preventing a reversal of direction of the sow, said barrier and brooder box jointly causing the sow to recline in a predetermined direction with its back against said barrier and its head directed toward the end of the house adjacent said exit door, an access opening through the end wall of said house adjacent the entry door at a location between said barrier and said front wall, and a closure moveably associated with said access opening.

4. A pig farrowing house of rectangular shape and plan comprising vertical front and rear longitudinal walls and relatively spaced end walls, said front wall being provided with relatively longitudinally spaced openings, entry and exit doors hingedly mounted for inward and outward opening movement only, respectively, in the respective openings, resilient means normally urging said doors toward closed position, a generally vertical rigid barrier in the said housing between and generally parallel to said front and rear walls, means for supporting said barrier above the floor at a level to permit movement of small pigs therebeneath while excluding the sow, brooder box means located in said house between its said entry and exit doors and cooperating with said sow barrier to define a narrow passage interconnecting said doors, and being of a width to permit unrestricted passage of the sow therethrough and reclining of the sow therein, while preventing the sow from turning around, an access opening through the end wall of said house into said passage, and a closure moveably associated with said access opening.

5. A pig farrowing house as defined in claim 4 wherein said rear wall is formed with an opening extending to the floor, a closure swingably mounted in said opening, and a screen extending across the lower portion of said opening.

6. A pig farrowing house as defined in claim 4, in which said roof is hinged along one edge to facilitate ventilation.

References Cited by the Examiner
UNITED STATES PATENTS

| | | | |
|---|---|---|---|
| 2,263,069 | 11/41 | Coyner | 119—20 X |
| 2,740,379 | 4/56 | Collins | 119—20 |
| 2,940,423 | 6/60 | Frye | 119—20 |
| 3,011,475 | 12/61 | Golay | 119—20 |
| 3,028,097 | 4/62 | Johnson | 119—20 X |

SAMUEL KOREN, *Primary Examiner.*